F. O. JAQUES, Jr.
PARING AND SLICING KNIFE.
APPLICATION FILED SEPT. 8, 1911.
1,008,599.  Patented Nov. 14, 1911.
Fig. 1.
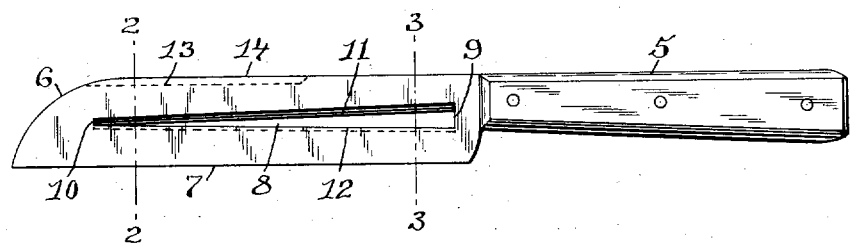
Fig. 2.  Fig. 3.
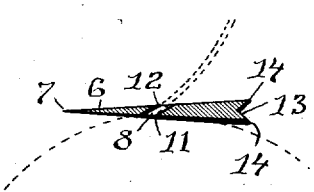 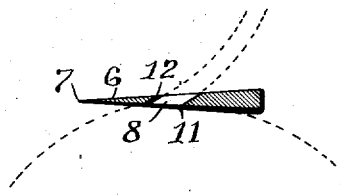
WITNESSES:  INVENTOR:
  Fernando Oscar Jaques, Jr.,
  by Chas. H. Luther
  ATTORNEY.

UNITED STATES PATENT OFFICE.

FERNANDO OSCAR JAQUES, JR., OF CRANSTON, RHODE ISLAND, ASSIGNOR TO EDUARD ELISHA PIERCE, OF PROVIDENCE, RHODE ISLAND.

PARING AND SLICING KNIFE.

1,008,599. Specification of Letters Patent. Patented Nov. 14, 1911.

Application filed September 8, 1911. Serial No. 648,316.

*To all whom it may concern:*

Be it known that I, FERNANDO OSCAR JAQUES, Jr., a citizen of the United States, residing at Cranston, in the county of Providence and State of Rhode Island, have invented a new and useful Improvement in Paring and Slicing Knives, of which the following is a specification.

This invention has reference to an improvement in culinary utensils and more particularly to an improvement in paring and slicing knives for culinary purposes.

In the construction and use of the usual kitchen knife for paring fruit and vegetables, there is nothing to gage or limit the thickness of the peeling, consequently the skin of the fruit or vegetable is generally cut off too thick causing waste and expense, also there is no paring and slicing knife, so far as known, for this purpose, that is constructed so that a thin or thick paring may be obtained by the same knife without adjusting and without changing the position of the knife in the hand.

The object of my invention is to improve the construction of a paring and slicing knife for culinary purposes, whereby fruit and vegetables may be pared so as to give a thin or thick paring, as required and the fruit or vegetable then sliced, without changing the position of the knife in the hand.

Another object of my invention is to construct a paring and slicing knife, so that, when protuberances occur on the surface of fruit or vegetables, the same may be quickly and easily removed in the operation of paring, without changing the position of the knife in the hand and without recourse to the use of the slicing edge of the knife to remove the same, thereby saving in the time required to properly prepare the fruit or vegetable.

A further object of my invention is to construct a paring and slicing knife blade with three integral cutting edges, two cutting edges for paring and one cutting edge for slicing and with two integral scraping edges on the back for scraping the skin from vegetables, such as potatoes.

My invention consists in the peculiar and novel construction of a paring and slicing knife, having details of construction, as will be more fully set forth hereinafter and claimed.

Figure 1. is a side view of my improved paring and slicing knife. Fig. 2. is an enlarged transverse sectional view through the blade, taken on line 2. 2. of Fig. 1., through the narrow portion of the slot, and Fig. 3. is an enlarged transverse sectional view similar to Fig. 2. taken on line 3. 3. of Fig. 1. through the wide portion of the slot.

In the drawing 5 indicates the handle and 6 the flat blade of the knife. The handle 5 may be of any well known construction and the blade 6 secured to the handle in any well known way. The flat blade 6 is constructed to have a knife edge 7 for slicing, a central longitudinally tapered slot 8 having its wide end 9 adjacent the handle 5 and its narrow end 10 adjacent the end of the blade, said slot being cut through the blade at a transverse angle forming two cutting edges 11 and 12 for paring as shown in Figs. 2 and 3, and a longitudinal V shaped groove 13 formed in the back of the blade and forming two scraping edges 14. 14. as shown in Figs. 1 and 2 all formed integral.

When in use, the knife is held by its handle in the hand in the usual position for cutting or slicing. A thin or thick paring may be obtained, by varying the position of the blade on the fruit or vegetable, so as to bring the narrow or wide portion of the slot 8 and the cutting edge 11 into position for cutting, as indicated in dotted lines in Figs. 2 and 3, or any intermediate thickness of peel or skin may be obtained and when the fruit or vegetable is pared, the same may be sliced by the use of the knife edge 7 all without changing the position of the knife in the hand. The scraping edges 14. 14. on the back of the blade are used for scraping new potatoes and the like and the cutting edge 12 is also used for paring, when required.

Having thus described my invention, I claim as new and desire to secure by Letters Patent:

1. A paring and slicing knife, comprising a flat knife blade, a handle set in line with the blade, said blade having a longitudinally tapered slot extending at a transverse angle through the blade, the side edges of the slot being formed into cutting edges for paring and a cutting edge on the blade for slicing, all formed integral.

2. A paring and slicing knife, comprising a flat knife blade, a handle set in line with the blade, said blade having a knife edge for slicing and two central longitudinal cutting edges set at an angle to each other, for paring, and forming a tapered longitudinal slot which extends through the blade, all formed integral.

3. The combination in a culinary utensil, of a flat knife blade, a handle set in line with the blade, said blade having two central longitudinal cutting edges set at an angle to each other for paring, and forming a tapered longitudinal slot which extends through the blade, and two longitudinal scraping edges on the back of the blade, formed by a longitudinal V shaped groove in the back of the blade, all formed integral.

4. The combination in a culinary utensil of a flat knife blade, a handle set in line with the blade, said blade having a cutting edge for slicing, two central longitudinal cutting edges set at an angle to each other for paring and forming a tapered longitudinal slot which extends through the blade, and two longitudinal scraping edges on the back of the blade, formed by a longitudinal V shaped groove in the back of the blade, all formed integral.

In testimony whereof, I have signed my name to this specification in the presence of two subscribing witnesses.

FERNANDO OSCAR JAQUES, JR.

Witnesses:
JOHN H. McNULTY,
CHAS. H. LUTHER.

Copies of this patent may be obtained for five cents each, by addressing the "Commissioner of Patents, Washington, D. C."

---

It is hereby certified that in Letters Patent No. 1,008,599, granted November 14, 1911, upon the application of Fernando Oscar Jaques, Jr., of Cranston, Rhode Island, for an improvement in "Paring and Slicing Knives," an error appears requiring correction as follows: In the grant and in the heading to the printed specification, the name of the assignee was erroneously written and printed "Eduard Elisha Pierce," whereas said name should have been written and printed *Edward Elisha Pierce;* and that the said Letters Patent should be read with this correction therein that the same may conform to the record of the case in the Patent Office.

Signed and sealed this 26th day of December, A. D., 1911.

[SEAL.]

C. C. BILLINGS,
*Acting Commissioner of Patents.* the blade, said blade having a knife edge for slicing and two central longitudinal cutting edges set at an angle to each other, for paring, and forming a tapered longitudinal slot which extends through the blade, all formed integral.

3. The combination in a culinary utensil, of a flat knife blade, a handle set in line with the blade, said blade having two central longitudinal cutting edges set at an angle to each other for paring, and forming a tapered longitudinal slot which extends through the blade, and two longitudinal scraping edges on the back of the blade, formed by a longitudinal V shaped groove in the back of the blade, all formed integral.

4. The combination in a culinary utensil of a flat knife blade, a handle set in line with the blade, said blade having a cutting edge for slicing, two central longitudinal cutting edges set at an angle to each other for paring and forming a tapered longitudinal slot which extends through the blade, and two longitudinal scraping edges on the back of the blade, formed by a longitudinal V shaped groove in the back of the blade, all formed integral.

In testimony whereof, I have signed my name to this specification in the presence of two subscribing witnesses.

FERNANDO OSCAR JAQUES, Jr.

Witnesses:
JOHN H. McNULTY,
CHAS. H. LUTHER.

---

Copies of this patent may be obtained for five cents each, by addressing the "Commissioner of Patents, Washington, D. C."

---

Correction in Letters Patent No. 1,008,599.

It is hereby certified that in Letters Patent No. 1,008,599, granted November 14, 1911, upon the application of Fernando Oscar Jaques, Jr., of Cranston, Rhode Island, for an improvement in "Paring and Slicing Knives," an error appears requiring correction as follows: In the grant and in the heading to the printed specification, the name of the assignee was erroneously written and printed "Eduard Elisha Pierce," whereas said name should have been written and printed *Edward Elisha Pierce;* and that the said Letters Patent should be read with this correction therein that the same may conform to the record of the case in the Patent Office.

Signed and sealed this 26th day of December, A. D., 1911.

[SEAL.]

C. C. BILLINGS,
*Acting Commissioner of Patents.*

Correction in Letters Patent No. 1,008,599.

It is hereby certified that in Letters Patent No. 1,008,599, granted November 14, 1911, upon the application of Fernando Oscar Jaques, Jr., of Cranston, Rhode Island, for an improvement in "Paring and Slicing Knives," an error appears requiring correction as follows: In the grant and in the heading to the printed specification, the name of the assignee was erroneously written and printed "Eduard Elisha Pierce," whereas said name should have been written and printed *Edward Elisha Pierce;* and that the said Letters Patent should be read with this correction therein that the same may conform to the record of the case in the Patent Office.

Signed and sealed this 26th day of December, A. D., 1911.

[SEAL.]

C. C. BILLINGS,
*Acting Commissioner of Patents.*